US011941940B2

(12) United States Patent
Nelson et al.

(10) Patent No.: US 11,941,940 B2
(45) **Date of Patent: *Mar. 26, 2024**

(54) SPORTING EVENT OVERLAYS WITH ACCUMULATING SYMBOLS

(71) Applicant: IGT, Las Vegas, NV (US)

(72) Inventors: Dwayne R. Nelson, Las Vegas, NV (US); Cameron A. Filipour, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,237

(22) Filed: Jul. 1, 2022

(65) Prior Publication Data

US 2022/0335777 A1 Oct. 20, 2022

Related U.S. Application Data

(63) Continuation of application No. 17/223,812, filed on Apr. 6, 2021, now Pat. No. 11,393,280.

(60) Provisional application No. 63/009,183, filed on Apr. 13, 2020.

(51) Int. Cl.
*G07F 17/32* (2006.01)

(52) U.S. Cl.
CPC ...... *G07F 17/3213* (2013.01); *G07F 17/3244* (2013.01); *G07F 17/3262* (2013.01); *G07F 17/3288* (2013.01); *G07F 17/3293* (2013.01)

(58) Field of Classification Search
CPC .......... A63F 13/12; A63F 13/20; A63F 13/69; A63F 13/828; A63F 13/88; A63F 2300/8052; A63F 2300/572; G07F 17/3288; G07F 17/3211; G07F 17/3246; G07F 17/3213; G07F 17/3244; G07F 17/3262; G07F 17/3293
See application file for complete search history.

(56) References Cited

U.S. PATENT DOCUMENTS

| | | | | |
|---|---|---|---|---|
| 4,883,636 | A | 11/1989 | Fantle, Jr. | |
| 5,564,701 | A * | 10/1996 | Dettor | A63F 3/00157 463/16 |
| 6,449,010 | B1 | 9/2002 | Tucker | |
| 6,910,965 | B2 | 6/2005 | Downes | |
| 7,128,320 | B2 | 10/2006 | Yamaguchi et al. | |
| 7,160,189 | B2 | 1/2007 | Walker et al. | |
| 7,341,517 | B2 | 3/2008 | Asher et al. | |
| 7,351,149 | B1 | 4/2008 | Simon et al. | |
| 7,566,268 | B2 | 7/2009 | Asher et al. | |
| 7,637,807 | B2 | 12/2009 | Asher et al. | |
| 7,789,754 | B2 | 9/2010 | Asher et al. | |
| 8,360,842 | B2 | 1/2013 | Simon | |
| 8,538,563 | B1 * | 9/2013 | Barber | G07F 17/3276 463/28 |
| 9,215,397 | B2 | 12/2015 | Ellis et al. | |
| 9,269,219 | B2 | 2/2016 | Lyons et al. | |
| 9,293,009 | B2 | 3/2016 | Asher et al. | |
| 9,345,957 | B2 | 5/2016 | Geisner et al. | |

(Continued)

*Primary Examiner* — Dmitry Suhol
*Assistant Examiner* — Jason Pinheiro
(74) *Attorney, Agent, or Firm* — Neal, Gerber & Eisenberg LLP

(57) ABSTRACT

A system which accumulates symbols and determines an award based on an event occurring (or not occurring) on a displayed game field associated with a sporting event interacting with a plurality of symbols overlaid on that displayed game field.

18 Claims, 9 Drawing Sheets

(56) References Cited

U.S. PATENT DOCUMENTS

| | | | | |
|---|---|---|---|---|
| 9,558,612 | B2 * | 1/2017 | Lyons | G07F 17/323 |
| 9,919,218 | B1 | 3/2018 | Wakeford et al. | |
| 10,318,879 | B2 | 6/2019 | Lopez et al. | |
| 10,347,085 | B2 | 7/2019 | Simon | |
| 10,559,160 | B1 * | 2/2020 | Oberberger | G07F 17/3213 |
| 10,810,841 | B2 * | 10/2020 | Nelson | G07F 17/3288 |
| 11,055,964 | B2 * | 7/2021 | Washington | A63F 13/837 |
| 11,087,595 | B2 | 8/2021 | Nelson et al. | |
| 11,127,254 | B2 * | 9/2021 | Oberberger | G07F 17/3206 |
| 11,410,503 | B2 * | 8/2022 | Nelson | G07F 17/3244 |
| 11,468,740 | B2 * | 10/2022 | Oberberger | G06F 3/017 |
| 2003/0011715 | A1 | 1/2003 | Kastelic | |
| 2005/0014551 | A1 * | 1/2005 | Packes | G07F 17/3244<br>463/17 |
| 2008/0058043 | A1 | 3/2008 | Amaitis et al. | |
| 2010/0259005 | A1 * | 10/2010 | Simon | A63F 1/00<br>463/2 |
| 2011/0292076 | A1 | 12/2011 | Wither et al. | |
| 2012/0184352 | A1 | 7/2012 | Detlefsen et al. | |
| 2012/0202599 | A1 * | 8/2012 | Cohen | A63F 13/798<br>463/43 |
| 2013/0095909 | A1 | 4/2013 | Odea | |
| 2014/0121015 | A1 * | 5/2014 | Massing | G07F 17/3211<br>463/31 |
| 2015/0105134 | A1 | 4/2015 | Cobb et al. | |
| 2016/0093154 | A1 * | 3/2016 | Bytnar | G07F 17/3237<br>463/25 |
| 2016/0110965 | A1 * | 4/2016 | Arnone | G07F 17/3288<br>463/25 |
| 2016/0171827 | A1 * | 6/2016 | Washington | G07F 17/3227<br>463/16 |
| 2016/0171835 | A1 * | 6/2016 | Washington | G07F 17/3223<br>463/25 |
| 2016/0358406 | A1 | 12/2016 | Daly | |
| 2017/0046906 | A1 * | 2/2017 | Hilbert | G07F 17/3225 |
| 2018/0322724 | A1 | 11/2018 | Ramos et al. | |
| 2020/0242895 | A1 | 7/2020 | Nelson et al. | |
| 2020/0327777 | A1 * | 10/2020 | Higgins | G07F 17/34 |
| 2021/0019999 | A1 * | 1/2021 | Nelson | G06Q 50/34 |
| 2021/0074126 | A1 * | 3/2021 | Nelson | G07F 17/3246 |
| 2021/0118264 | A1 * | 4/2021 | Nelson | G07F 17/3288 |

* cited by examiner

1000

SPORTING EVENT OVERLAYS WITH ACCUMULATING SYMBOLS

PRIORITY CLAIM

This application is a continuation of, claims the benefit of and priority to U.S. patent application Ser. No. 17/223,812, filed on Apr. 6, 2021, which claims the benefit of and priority to U.S. Provisional Patent Application No. 63/009,183, filed on Apr. 13, 2020, the entire contents of which are each incorporated by reference herein.

BACKGROUND

The present disclosure pertains to overlaying symbols in association with a displayed sporting event and accumulating zero, one or more of such overlaid symbols for one or more award evaluations.

Sports betting terminals may enable a player to place a sports wager predicting the results of a sporting event.

BRIEF SUMMARY

In certain embodiments, the present disclosure relates to a system including a processor, and a memory device that stores a plurality of instructions. When executed by the processor, the instructions cause the processor to cause a display device to display a game field associated with a sporting event, and place a plurality of symbols on a virtual game field overlaid on the displayed game field associated with the sporting event. When executed by the processor, for each placed symbol and responsive to an event occurring during the sporting event in an area of the displayed game field corresponding to an area of the virtual game field associated with that placed symbol, the instructions cause the processor to accumulate that placed symbol. When executed by the processor responsive to an accumulated symbol evaluation event, the instructions cause the processor to determine an award based on any accumulated symbols, and cause the display device to display the determined award.

In certain embodiments, the present disclosure relates to a system including a processor, and a memory device that stores a plurality of instructions. When executed by the processor, the instructions cause the processor to cause a display device to display a game field associated with a sporting event. When executed by the processor responsive to a placement of a first wager amount and a first input received by an input device, the instructions cause the processor to place a first plurality of symbols on a virtual game field overlaid on the displayed game field associated with the sporting event. When executed by the processor responsive to a placement of a second, different wager amount and a second, different input received by the input device, the instructions cause the processor to place a second, different plurality of symbols on the virtual game field overlaid on the displayed game field associated with the sporting event. When executed by the processor, for each of a plurality of symbol display positions associated with a plurality of reels and responsive to an event occurring during the sporting event in an area of the displayed game field corresponding to an area of the virtual game field associated with one of the plurality of placed symbols, the instructions cause the processor to cause the display device to display that placed symbol at that symbol display position. When executed by the processor, the instructions cause the processor to determine an award based on the symbols displayed at the symbol display positions, and cause the display device to display the determined award.

In certain embodiments, the present disclosure relates to a method of operating a system including displaying, by a display device, a game field associated with a sporting event, and placing, by a processor, a plurality of symbols on a virtual game field overlaid on the displayed game field associated with the sporting event. For each placed symbol, the method includes, responsive to an event occurring during the sporting event in an area of the displayed game field corresponding to an area of the virtual game field associated with that placed symbol, accumulating, by the processor, that placed symbol. Responsive to an accumulated symbol evaluation event, the method includes determining, by the processor, an award based on any accumulated symbols, and displaying, by the display device, the determined award.

Additional features are described herein, and will be apparent from the following Detailed Description and the figures.

DETAILED DESCRIPTION

In various embodiments, the systems and methods of the present disclosure include an accumulation of zero, one or more symbols based on one or more events occurring (or not occurring) on a displayed game field of a sporting event interacting with one or more symbols overlaid on that displayed game field. In these embodiments, the systems and methods of the present disclosure additionally include an evaluation of any accumulated symbols to determine any awards.

In certain embodiments, upon a triggering event, the system displays a video stream of a sporting event including a game field associated with the sporting event. In addition to displaying the sporting event, the system places a plurality of overlay symbols at one or more areas of a virtual game field associated with the game field of the sporting event. For example, the system displays a video stream of a play of a football game with a plurality of symbols overlaid in association with one or more areas of a virtual game field associated with the football field.

Following the placement of the plurality of symbols on the virtual game field, the system determines if an accumulation event occurred in association with any of the symbols. In certain embodiments, an accumulation event occurs based on one or more events occurring (or not occurring) in an area of the game field of the sporting event corresponding to the overlaid areas of the virtual game field where such symbols were placed. For example, during the play of a football game, the system determines that an accumulation event occurred if a football player completes a catch in an area of the football field corresponding to an overlaid area of the virtual game field where a symbol was placed.

In addition to accumulating any placed symbols that correspond with any accumulation events occurring, the system determines whether or not an accumulated symbol evaluation event occurred. That is, the system determines whether to evaluate any accumulated symbols to determine any associated awards. Responsive to an accumulated symbol evaluation event occurring, the system determines and displays any awards to the player based on the accumulated symbols. Such a configuration of accumulating symbols based on one or more events of the sporting event occurring (or not occurring) introduce an additional avenue for a bystander to interact with a sporting event and potentially win additional awards in the process. Additionally, by integrating symbol accumulation into a display of a sporting event, the system provides an engaging experience for players by converting a passive activity (i.e., watching a sporting event) into an active activity (i.e., placing a plurality of symbols on an overlaid virtual game field associated with an area of the displayed game field of a sporting event).

Figure 1:
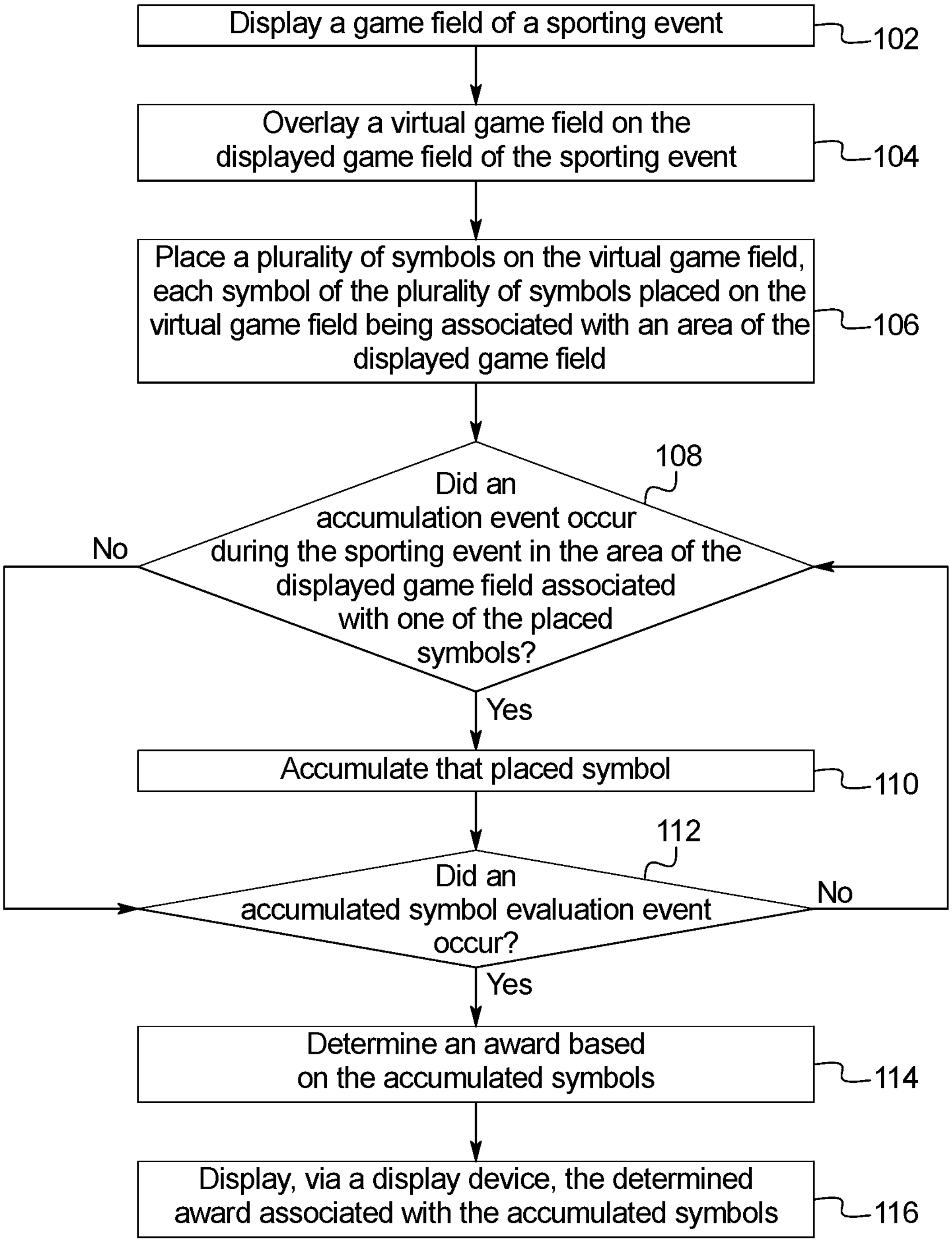
FIG. 1 is a flow chart of an example process for operating a system of one embodiment of the present disclosure which enables a user to accumulate a plurality of symbols overlaid in association with a displayed sporting event.

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

Figure 2A:
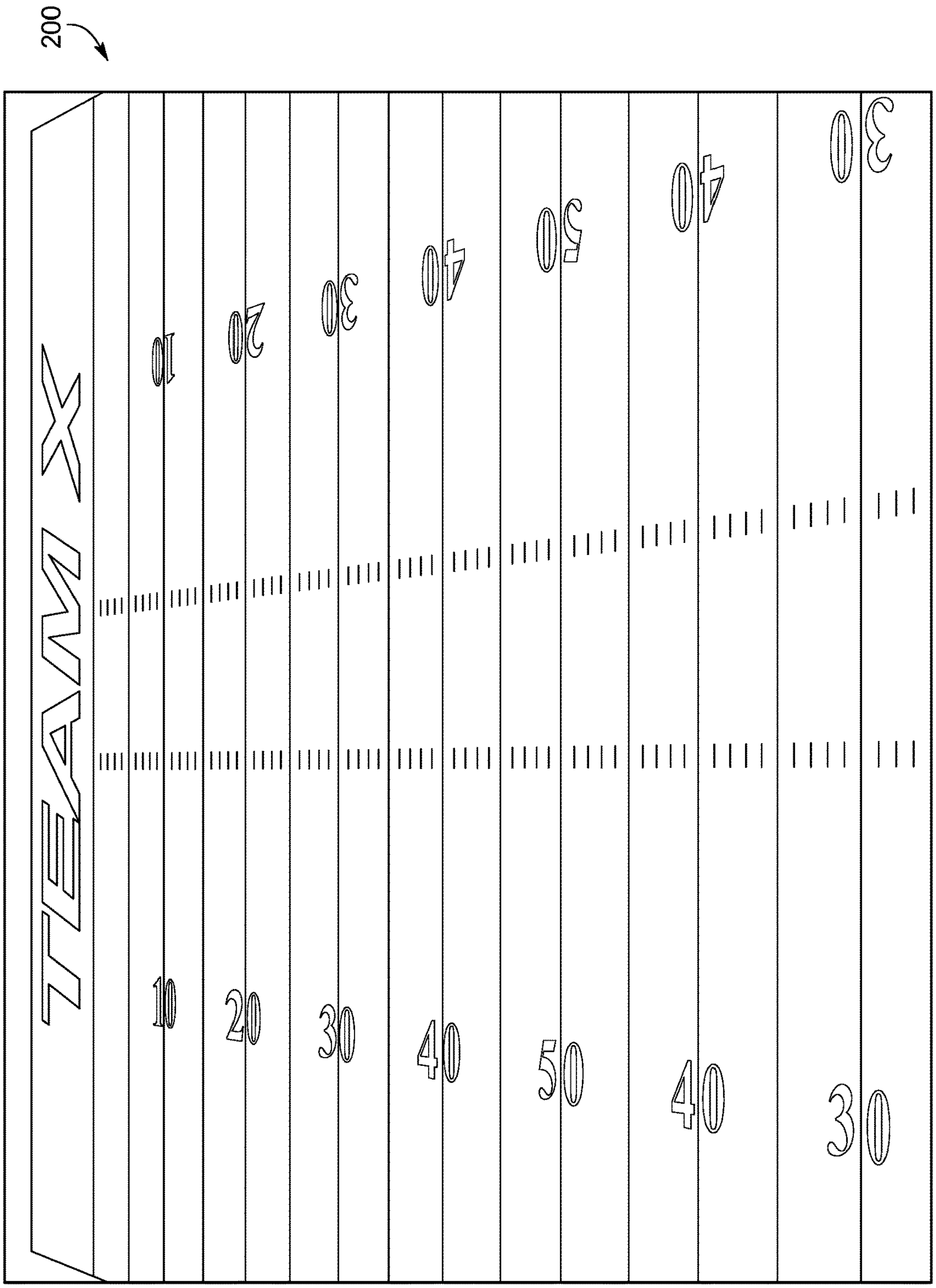
FIGS. 2A, 2B, 2C, and 2D are front views of one embodiment of the system of the present disclosure illustrating an accumulation and evaluation of a plurality of symbols overlaid in association with a displayed sporting event.

In certain embodiments, upon a triggering event, the system displays a game field of a sporting event as indicated by block 102 of FIG. 1. In different embodiments, the triggering event which causes the system to display the game field of the sporting event includes one or more of a placement of a sporting event wager on the play of the sporting event, a placement of a wager on a symbol game, and/or an input to display the sporting event. In one example, as seen in FIG. 2A, an electronic gaming machine ("EGM") displays a game field 200 (e.g., a football field) associated with a sporting event (e.g., a football game). In certain embodiments, an EGM includes any suitable device that displays one or more sporting events and zero, one or more games of chance (or games of skill) including, but not limited to, a slot machine, a video poker machine, a video lottery terminal, a terminal associated with an electronic table game, a video keno machine, a video bingo machine, and a sports betting terminal, such as a sports betting kiosk.

In certain embodiments, the system displays a plurality of sporting events. In these embodiments, the system displays a separate game field for each of the plurality of sporting events. In these embodiments, the system includes one or more display devices to simultaneously display each of the game fields associated with the plurality of sporting events. For example, a display device includes a first viewing area that displays a first game field from the first sporting event and further includes a second viewing area that displays a second game field from the second sporting event. In another such embodiment, the system includes a plurality of display devices to display the plurality of sporting events. For example, a first display device displays a first game field associated with the first sporting event and a second display device displays a second game field associated with the second sporting event. In another embodiment, the system displays one or more sporting events and one or more wagering games of chance (and/or games of skill).

Figure 2B:
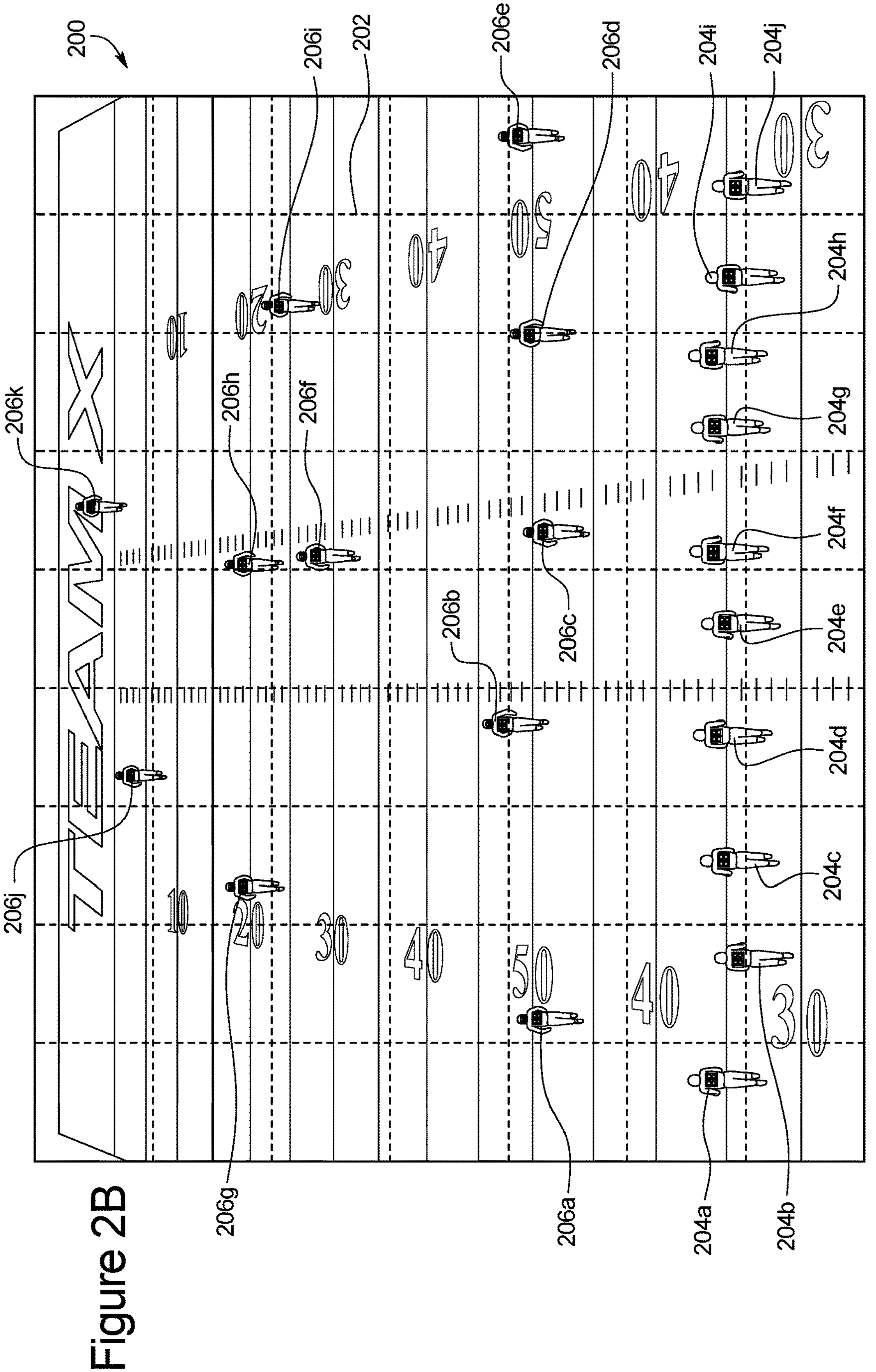

In addition to displaying the game field as part of the video stream of the sporting event, in certain embodiments, the system displays a plurality of sporting event elements on the displayed game field as part of the video stream of the sporting event. For example, as seen in FIG. 2B, the EGM displays a football game, wherein a first team of sporting event participants 204*a* to 204*j* (i.e., a first set of sporting event elements) and a second team of sporting event participants 206*a* to 206*j* (i.e., a second set of sporting event elements) are each lined up on the displayed game field 200 (e.g., the football field).

It will be appreciated that while the displayed game field is illustrated as a football field, the system can display any suitable game field or sporting event surface associated with any suitable sporting event at any professional and/or amateur level of any suitable sport, including but not limited to, basketball, baseball, boxing, horse racing, wrestling, mixed martial arts, golf, cricket, soccer, hockey, field hockey, tennis, volleyball, table tennis, ruby, swimming, diving, archery, cycling, billiards, fishing, gymnastics, hunting, track and field, sailing, and/or car racing.

In certain embodiments, the displayed game field is associated with a live sporting event. In certain other embodiments, the displayed game field is associated with an upcoming sporting event. In different embodiments, the displayed sporting event (including the displayed game field) is selected by a player, selected by an operator, such as a gaming establishment operator, selected based on scheduling (i.e., which sporting events are currently being played live or which upcoming sporting events will be played live), selected based on popularity (e.g., sporting events including sports teams from more populous cities are selected over sporting events including sports teams from less populous cities), and/or selected based on location (e.g., a sporting event played at a first location relatively closer to a gaming establishment is selected over a sporting event played at a second location relatively further away from the gaming establishment).

In certain embodiments, the displayed game field is associated with a historical sporting event, such as a prerecorded sporting event, or a recreation of a prior sporting event. In these embodiments, to prevent players from determining an outcome of the historic sporting event, the system masks certain of the identifying information associated with that historic sporting event. That is, the system anonymizes identifying information about teams, historical team records, historical sporting event players, and/or historical sporting event player statistics prior to displaying the game field associated with the historical sporting event.

In certain embodiments, the displayed game field is associated with virtual or electronic sporting ("eSport") events. In these embodiments, such virtual or eSports events are played by humans, by computer driven participants, or by a mix of human and computer driven participants.

In different embodiments, the system overlays a virtual game field onto the displayed game field, as indicated by block 104 of FIG. 1. In one embodiment, the system overlays the virtual game field onto the displayed game field when the play of the sporting event begins. In another embodiment, the system overlays the virtual game field onto the displayed game field when the player provides one or more inputs to place one or more symbols on the virtual game field.

In one example, as seen in FIG. 2B, the EGM overlays a virtual game field 202 (shown in phantom) onto the displayed game field 200. The virtual game field 202 may be a rectangular array including a plurality of array rectangles 203 of substantially equal or unequal sizes (within resolution tolerances of the display device) arranged in one or more rows and one or more columns. While the virtual game field 202 is shown as a 9×7 array of a plurality of array rectangles 203, any suitable configuration of the array pattern may be utilized for the virtual game field 202. Additionally, the virtual game field 202 may be defined by a non-rectangular array including but not limited to, a square array, a double dimension array, or any other suitable array patterns.

In different examples, the system associates or otherwise places the virtual game field over the entire displayed game field or a portion of the displayed game field. As seen in FIG. 2B, each of the array rectangles 203 of the virtual game field 202 are associated with an area of the displayed game field 200. It should be appreciated that while the virtual game field 202 is visibly shown (i.e., the visible rectangular grid array of array rectangles 203) in FIG. 2B, in another example, the virtual game field is invisible to the player. In this example, the player does not see the virtual game field 202 when viewing the displayed game field 200. In another example, the system enables the player and/or the operator to select to make the virtual game field 202 visible and/or invisible with respect to the displayed game field 200.

Figure 2C:
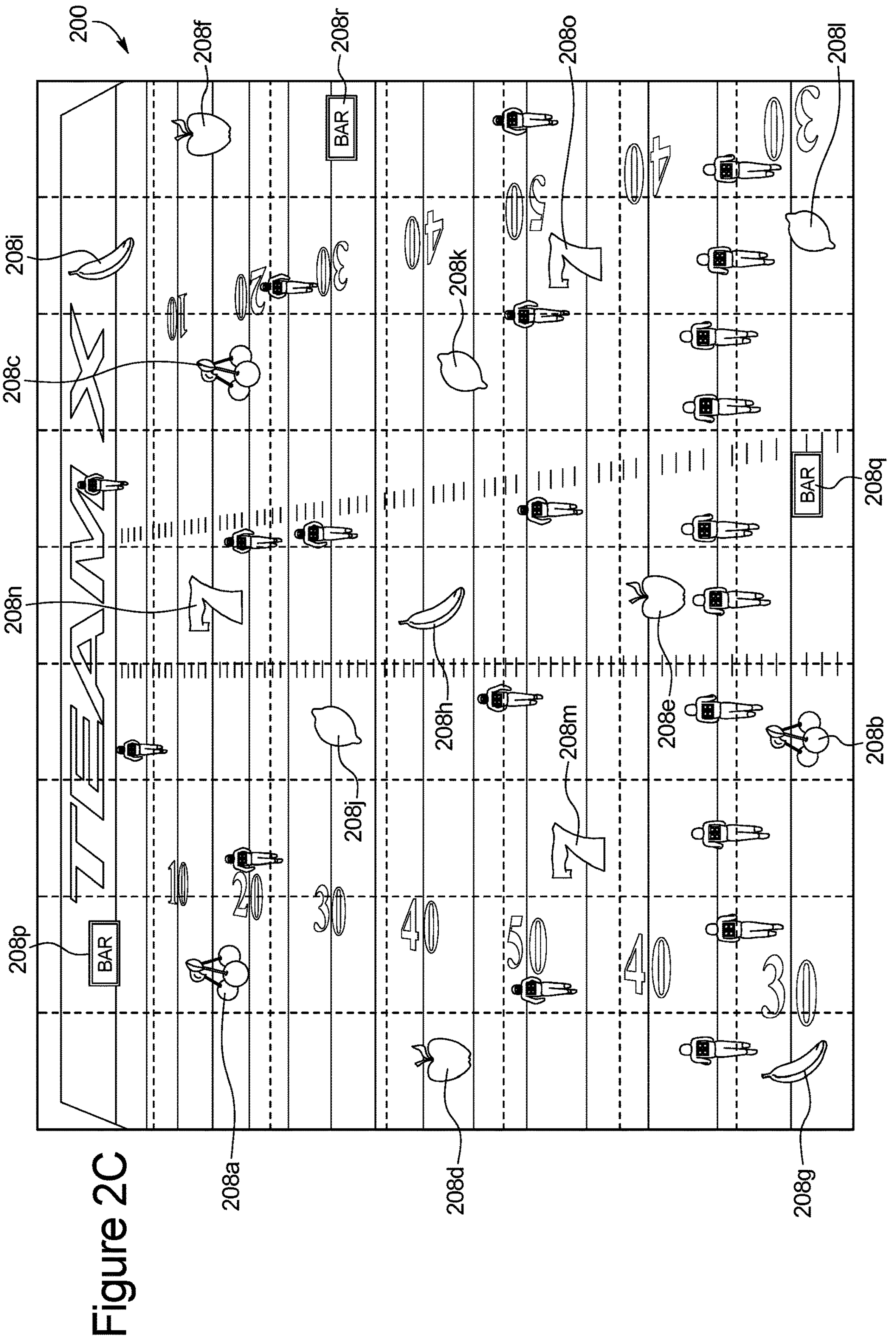

Following the overlay of the virtual game field onto the displayed sporting event, in certain embodiments, the system enables the player to place a plurality of symbols onto the virtual game field, wherein each symbol of the plurality of symbols placed on the virtual game field is associated with an area of the displayed game field, as indicated by block 106 of FIG. 1. In certain embodiments, the system enables the player to indicate the placement of each symbol of the plurality of symbols by selecting a different area of the virtual game field associated with a corresponding area of the displayed game field for each symbol of the plurality of symbols. For example, as illustrated in FIG. 2C, the EGM enables a player to make a plurality of inputs to select or otherwise choose a position for a plurality of symbols *208a*, *208b*, *208c*, *208d*, *208e*, *208f*, *208g*, *208h*, *208i*, *208j*, *208k*, *208l*, *208m*, *208n*, *208o*, *208p*, *208q*, and *208r* on the virtual game field 202. In this illustrated example, the EGM displays the symbols *208a* to *208r* overlaid onto the virtual game field associated with the displayed game field 200. Accordingly, each symbol *208a* to *208r* is a visibly placed symbol on the virtual game field 202 associated with area of the displayed game field 200. While FIG. 2C illustrates eighteen placed symbols, it should be appreciated any suitable quantity of symbols may be placed on the virtual game field by the player, an operator of the system and/or a third-party, such as business affiliated with the sporting event In certain embodiments, the system randomly places each symbol of the plurality of symbols at a different area of the virtual game field associated with a corresponding area of the displayed game field for each symbol of the plurality of symbols. In one such embodiment, the system receives a wager from a player on one or more symbols and then places the wagered on symbols at a random position on the virtual game field associated with an area of the displayed game field. In another such embodiment, the system places the symbols at a random position on the virtual game field associated with an area of the displayed game field and then enables the player to decide to place (or not place) a wager on the randomly placed symbols.

In certain embodiments, the system associates each symbol of the plurality of symbols placed on the virtual game field with a different area of the displayed game field. In one such embodiment, the system receives a single wager amount for all of the placed symbols on the virtual game field associated with the different areas of the displayed game field. In another such embodiment, the system receives different wagers and/or different wager amounts for each of the placed symbols on the virtual game field associated with the different areas of the displayed game field. In these embodiments, upon an occurrence of a symbol placement event (e.g., receipt of a wager) the system enables the placement of a plurality of symbols or markers (whether placed manually by the player or randomly by the system) on a virtual game field wherein each placed symbol or marker designates a different associated area of the game field of the sporting event.

In certain embodiments, the system restricts placement of the plurality of symbols at one or more locations of the virtual game field. In such embodiments, if the system determines there is a relatively high likelihood that a sporting event team and/or sporting event participant (i.e., one or more sporting event elements) will interact with an area of the displayed game field (e.g., an area directly behind, in front, to the right, or to the left of the sporting event team and/or sporting event participant) corresponding to an overlaid area of the virtual game field where a symbol may be placed, the system restricts placement of any symbols within a predefined area surrounding the sporting event team and/or the sporting event participant. For example, the system restricts the player from placing any symbols on the virtual game field associated with an area within five yards of the line of scrimmage of the displayed game field of a football game.

In certain embodiments, the system restricts the plurality of symbols from being placed outside of a predefined area on a virtual game field. In such embodiments, the system overlays the predefined area onto the displayed game field to illustrate where the plurality of symbols may be placed. For example, the system overlays a rectangular box on a virtual game field associated with an area of the displayed game field and enables the placement of the symbols within the rectangular box (i.e., the predefined area) on the virtual game field, while restricting the placement of the symbols outside the rectangular box on the virtual game field.

In certain embodiments, the system enables a player to place a wager on the plurality of symbols placed onto the virtual game field wherein, as described below, such wagers are resolved based an accumulation of one or more of the plurality of symbols caused by one or more interactions and/or events that may occur (or not occur) during the play of the sporting event in an area of the displayed game field associated with an area of the virtual game field where the plurality of symbols are placed.

In certain such embodiments, a wager amount placed by the player defines the dimension (e.g., radius) of the interaction area of the virtual game field associated with an area of the displayed game field. For example, for a $5 wager amount, the system defines the interaction area of each of the plurality of symbols placed onto the virtual game field associated with the displayed game field as a circular interaction area having a 1 yard radius. In another example, for a $10 wager amount, the system defines the interaction area of each of the plurality of symbols placed onto the virtual game field associated with the displayed game field as a circular interaction area having a 3 yard radius. As such, in certain embodiments, based on the placed wager amount, the system enables the player to increase or decrease the dimension of the interaction area of each symbol of the plurality of symbols placed onto the virtual game field associated with the displayed game field.

In certain embodiments, the system enables a selection of one sporting event team (e.g., a set of sporting elements) and the system places a wager on at least one player from the selected sporting event team to interact with the area of the displayed game field corresponding to an overlaid area of the virtual game field where a symbol was placed. In another embodiment, the system enables a selection of a specific sporting event participant (e.g., a specific sporting element) and the system places a wager on that specific sporting event participant to interact with the area of the displayed game field corresponding to an overlaid area of the virtual game field where a symbol was placed. In another embodiment, the system enables a selection of a specific set of sporting event participants (e.g., a set of specific sporting elements) and the system places a wager on that specific set of sporting event participants to interact with the area of the displayed game field corresponding to an overlaid area of the virtual game field where a symbol was placed.

Figure 2D:
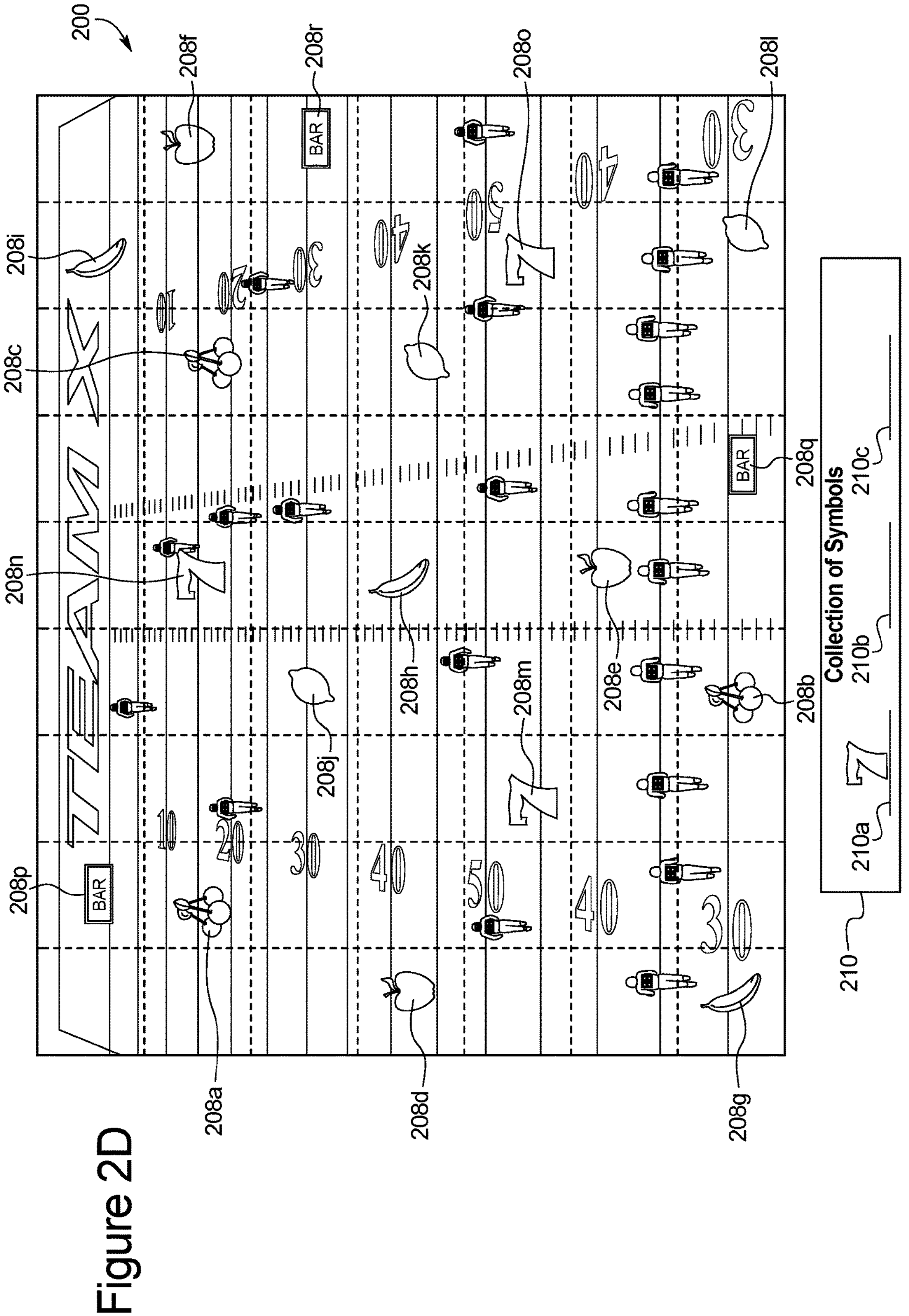

Following the placement of a plurality of symbols, as indicated by diamond 108 of FIG. 1, the system determines if an accumulation event occurred during the sporting event in the area of the displayed game field associated with one of the placed symbols. In certain embodiments, the system determines that an accumulation event occurred when a sporting event participant (e.g., a player or referee) and/or sporting event element (e.g., a ball) interacts with the area of the displayed game field corresponding to an overlaid area of the virtual game field where a symbol is placed. For example, FIG. 2D shows the occurrence of an accumulation event due to the sporting event participant 206*k* interacting with (e.g., entering) the area of the displayed game field 200 corresponding to the area of the virtual game field associated with the placed symbol 208*c*. In this example, the accumulation event occurs when the sporting event participant 206*k* makes a play or was otherwise involved in a designated game action during the sporting event in the area of the displayed game field 200 corresponding to an overlaid area of the virtual game field where the symbol 208*c* was placed.

It should be appreciated that any suitable activity or non-activity associated with any sporting event element of any sporting event may qualify as that sporting event element interacting with the area of the displayed game field that corresponds to the overlaid area of the virtual game field where a symbol was placed. In certain embodiments, such activity includes a sporting event element, such as a sporting event participant or a sporting event object (e.g., a ball) entering (or leaving) the area of a displayed game field corresponding to the overlaid area of a virtual game field associated with a placed symbol.

In certain embodiments, such activity includes a sporting event element, such as a sporting event participant or a sporting event object performing (or not performing) or otherwise being involved in one or more actions in the area of a displayed game field corresponding to the area of a virtual game field associated with a placed symbol. In certain embodiments, such activity includes a sporting event element, such as a sporting event participant or a sporting event object performing (or not performing) or otherwise being involved in one or more actions outside of the area of a displayed game field corresponding to an area of a virtual game field associated with a placed symbol.

In certain embodiments, as mentioned above, a predefined dimension (e.g., radius) defines an interaction area of the plurality of symbols placed on the virtual game field associated with an area of the displayed game field. That is, when determining if an accumulated event occurred based on an activity associated with a sporting event element that interacts with the area of a displayed game field corresponding to the overlaid area of a virtual game field where a symbol was placed, the system determines if such activity occurred within the defined interaction area of the displayed game field associated with that placed symbol. For example, for a displayed football game, the system defines on the virtual game field a circular interaction area having a 1 yard radius as the area of the displayed game field associated with a placed symbol, wherein the system determines an accumulation event occurs if a designated play occurs (e.g., a sporting event participant fumbles the football or a sporting event participant makes a reception) within the circular interaction area having a 1 yard radius of the displayed game field corresponding to the overlaid area of a virtual game where a symbol was placed.

When the system determines that an accumulation event occurred in the area of the displayed game field corresponding to an overlaid area of the virtual game field where a symbol was placed, the system accumulates that placed symbol, as indicated by block 110 of FIG. 1. For example, FIG. 2D shows the occurrence of an accumulation event due to the sporting event participant 206*k* interacting with (e.g., entering) the area of the displayed game field 200 corresponding to the area of the virtual game field associated with the placed symbol 208*c*. In this example, the accumulation event occurs when the sporting event participant 206*k* makes a play or was otherwise involved in a designated game action during the sporting event in the area of the displayed game field 200 corresponding to an overlaid area of the virtual game field where the symbol 208*c* is placed. In this example, the system accumulates the symbol 208*c* and places the symbol onto a symbol display position 210*a* associated with a collection of symbols 210. In certain embodiments, the collection of symbols is associated with a predefined number of reels, wherein when the system accumulates a symbol, that symbol is placed at an available symbol display position associated with a reel of the collection of symbols. In certain embodiments, once all of the reels are full, the system determines that an accumulated symbol evaluation event occurred and the collection of symbols is evaluated.

In certain embodiments, the plurality of symbols include reel symbols of a slot game. In these embodiments, the system utilizes a slot game evaluation to evaluate the collection of symbols accumulated during the sporting event. In certain embodiments, the plurality of symbols include different playing cards. In certain embodiments, the plurality of symbols associated with the playing cards are card suits (e.g., Spades, Clubs, Diamonds, or Hearts). In certain other embodiments, the symbols associated with the playing cards are card faces (e.g., Jack, Queen, King, or Ace). In different embodiments, the system utilizes a playing card game evaluation, including but not limited to, a poker game evaluation, a blackjack game evaluation, a baccarat game evaluation, or other suitable card game evaluation to evaluate the collection of symbols accumulated during the sporting event. For example, the system provides an award for a "pair of Jacks" in a poker hand of cards formed by the collection of symbols.

In certain embodiments, the plurality of placed symbols include one or more designated symbols that modify or change the collection of accumulated symbols. In different embodiments, the designated symbols include, but are not limited to, a designated symbol that causes the system to remove all of the accumulated symbols from the collection of symbols, a designated symbol that randomly causes the system to remove one of the accumulated symbols from the collection of symbols, a designated symbol that causes the system to remove the last accumulated symbol from the collection of symbols, a designated symbol that causes the system to modify a previously accumulated symbol from the collection of symbols (e.g., change a cherry symbol to an apple symbol, or change a suit of a playing card), a designated symbol that causes the system to add a randomly selected symbol into the collection of symbols (e.g., a random symbol, or a random playing card), a designated symbol that causes the system to immediately evaluate the collection of symbols (even though an accumulation symbol evaluation event did not occur), a designated symbol that causes the system to add or remove a symbol display position and/or a reel from the collection of symbols (e.g., increase the symbol display positions from three symbol display positions to four symbol display positions, increase the number of reels from three reels to four reels, decrease the number of symbol display positions from three symbol display positions to two symbol display positions, and/or decrease the number of reels from three reels to two reels), and/or a designated symbol that causes the system to change the order of the accumulated symbols of the collection of symbols.

In certain embodiments, a plurality of symbols are each associated with a duration, such as an amount of time or a quantity of one or more plays during the sporting event, for an accumulation event to occur in association with that symbol. In these embodiments, if no accumulation event occurred during the sporting event in the area of the displayed game field corresponding to an overlaid area of the virtual game field where a symbol was placed prior to the expiration of the associated duration, the plurality of placed symbols expires. In different examples, a plurality of symbols placed on a virtual game field associated with an area of a displayed football field expires at the conclusion of a current period or duration, such as the current play, the conclusion of the current drive, the conclusion of the current quarter, or other suitable duration of the sporting event. In these examples, when that plurality of placed symbols expires, no more potential award opportunities are associated with the plurality of placed symbols.

In certain embodiments, if the system determines that an accumulation event occurred in association with one of the placed plurality of symbols, the system accumulates and removes that placed symbol from the virtual game field. That is, upon determining that a sporting event element of a sporting event interacted with an area of the game field corresponding to an overlaid area of the virtual game field where a symbol was placed, the system accumulates and removes that placed symbol from the virtual game field such that the accumulated symbol cannot be involved in another accumulation event. In another embodiment, if the system determines that an accumulation event occurred in association with one of the placed symbols, the system accumulates and retains that placed symbol on the virtual game field until that placed symbol expires. That is, upon determining that a sporting event element of a sporting event interacted with an area of the game field corresponding to an overlaid area of the virtual game field where a symbol was placed, the system accumulates and retains that placed symbol on the virtual game field such that the accumulated symbol can be involved in another accumulation event.

Referring back to diamond 108 of FIG. 1, if the system determines that an accumulation event did not occur during the sporting event in the area of the displayed game field corresponding to an overlaid area of the virtual game field where a symbol was placed, the system proceeds to diamond 112 of FIG. 1. That is, if an accumulation event did not occur based on a lack of interaction of a sporting event element with an area of the game field corresponding to an overlaid area of the virtual game field where a symbol was placed, the system does not accumulate the placed symbol.

After the system accumulates the placed symbol (or determines that an accumulation event did not occur), the system determines if an accumulated symbol evaluation event occurred, as indicated by diamond 112 of FIG. 1. In certain embodiments, the system determines that an accumulated symbol evaluation event occurred when the collection of symbols reaches a predefined number of collected symbols. In certain embodiments, the system determines that an accumulated symbol event occurred when the system collects a predefined number of symbols within a predefined amount of time. For example, the system determines that an accumulated symbol evaluation event occurred when the system accumulates or collects five different placed symbols during a defined time period (e.g., two minute portion) of the sporting event.

In certain embodiments, the system periodically determines if an accumulated symbol evaluation event occurred in association with a plurality of placed symbols. In one such embodiment, the system determines at designated time intervals whether or not an accumulated symbol evaluation event occurred in association with a plurality of placed symbols. In another such embodiment, the system determines in real time whether or not an accumulated symbol evaluation event occurred in association with a plurality of placed symbols. In another such embodiment, the system determines that an accumulated symbol evaluation event occurred when all the symbol display positions of a collection of symbols (such as collection of symbols 210 in FIG. 2D) are filled with accumulated symbols.

When the system determines that an accumulated symbol evaluation event occurred, the system determines an award based on the accumulated symbols, as indicated by block 114 of FIG. 1. On the other hand, if the system determines that an accumulated symbol evaluation event did not occur, as indicated by diamond 112 of FIG. 1, the system returns to diamond 108, and continues to monitor and determine if an accumulation event occurred during the sporting event in the area of the displayed game field corresponding to an overlaid area of the virtual game field where a symbol was placed. That is, if no accumulated symbol evaluation event occurred, the system does not determine any award in association with any accumulated symbols of the plurality of placed symbols In certain embodiments, the system determines the award based on a paytable (not shown) associated with the accumulated symbols. In certain embodiments, the system adjusts the potential payout amount associated with the position of the placed plurality of symbols on the virtual game field. That is, since certain sporting event elements are relatively more likely to interact with certain areas of the displayed game field at different points in time during the live sporting event, the system adjusts the award amounts available to be won in association with certain areas of the displayed game field corresponding to an overlaid area of the virtual game field where a symbol was placed. Put differently, the system adjusts the average expected payout on a wager if the system determines, based on a historical analysis, that the sporting event team and/or sporting event participant (i.e., one or more sporting event elements) has a relatively high likelihood (or a relatively low likelihood) of interacting with and/or making a designated play in the area of the displayed game field corresponding to an overlaid area of the virtual game field where a symbol was placed. For example, a wager placed on an accumulation of symbols placed on a virtual game field associated with an area within five yards of the line of scrimmage of a displayed football field will have a lower payout amount (if an accumulation event occurs in association with the placed symbols) than a wager placed on an accumulation of symbols placed on a virtual game field associated with an area thirty yards away from the line of scrimmage of the displayed football field (if an accumulation event occurs in association with the placed symbols).

In another embodiment, the system determines the award based on one or more pari-mutual pools associated with the accumulated symbols. In certain embodiments, the system enables a player to place a wager place one or more symbols on the virtual game field wherein the wagers are placed into a pool for the next play of the sporting event and the winnings are distributed pari-mutually.

In certain embodiments, the collection of symbols includes a sliding window such that when the collection of symbols is filled, the collection of symbols are evaluated and then the first position of the collection of symbols is emptied and the remaining symbols are shifted one position to the left. For example, the collection of symbols 210 of FIG. 2D includes three symbol display positions 210*a*, 210*b*, and 210*c*. Once the symbol display positions 210*a*, 210*b*, and 210*c* of the collection of symbols 210 are filled, the EGM determines that an accumulated symbol evaluation event occurred. As such, the EGM of this example evaluates and determines any awards for that collection of symbols. In this example, after the system determines any awards associated with the accumulated symbol evaluation event, the EGM removes the accumulated symbol from the symbol display position 210*a*, the EGM moves the accumulated symbol from the symbol display position 210*b* to the symbol display position 210*a*, and the EGM moves the accumulated symbol from the symbol display position 210*c* to the symbol display position 210*b* such that slot the symbol display position 210*c* is now empty.

In certain embodiments, the system awards the highest valued collection of accumulated symbols formed within a duration. For example, for a collection of symbols that form a hand of playing cards, the player collects a first collection of symbols that form pair of tens, the player collects a second collection of symbols that form a flush, and the player collects a third collection of symbols that form a pair of kings. In this example, at the conclusion of the duration, the system provides the player with an award associated with the collection of symbols that form a flush because the system determined that the accumulated symbols forming the flush provided the highest valued award to the player.

Following the determination of the award based on the accumulated symbols, the system displays the determined award associated with the accumulated symbols, as indicated by block 116 of FIG. 1.

In certain embodiments, the system provides an award based on the player accumulating a predefined designated number of collected symbols. In certain embodiments, the system provides an award based on whether the player accumulated the predefined designated number of collected symbols within a predefined amount of time. For example, the system provides an award to the player if that player accumulates or collects five different placed symbols during a 2 minute time period of the sporting event.

In different embodiments, the award determined in association with an accumulated symbol evaluation event based on an accumulation of symbols caused by an interaction occurring within the area of a displayed game field corresponding to an overlaid area of a virtual game field associated with a placed symbol includes, but is not limited to, one or more of: a quantity of monetary credits, a quantity of non-monetary credits, a quantity of promotional credits, a quantity of player tracking points, a progressive award, a modifier, such as a multiplier, a quantity of free plays of one or more games or symbol placements, a quantity of plays of one or more secondary or bonus games, a multiplier of a quantity of free plays of a game, one or more lottery based awards, such as lottery or drawing tickets, a wager match for one or more plays of one or more games or placed symbols, an increase in the average expected payback percentage for one or more plays of one or more games or placed symbols, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of a gaming establishment (e.g., a 20% off coupon for use at a convenience store), virtual goods associated with the system, virtual goods not associated with the system, an access code usable to unlock content on an internet.

It should be appreciated that the system of the present disclosure introduces an additional avenue for a bystander to interact with a sporting event and potentially win additional awards in the process. Additionally, by integrating symbol accumulation into a display of a sporting event, the system provides an engaging experience for players by converting a passive activity (i.e., watching a sporting event) into an active activity (i.e., placing a plurality of symbols on an overlaid virtual game field associated with an area of a displayed game field of a sporting event).

In certain embodiments, the system enables a selection of a specific sporting event participant to interact with and/or make a play in the area of the displayed game field associated with the placed symbols. For example, in the football game example illustrated in FIGS. 2A to 2D, the player selects the sporting event participant holding the football to interact with and/or make a play in the area of the displayed game field corresponding to an overlaid area of the virtual game field where one or more of the plurality of symbols were placed. In this example, the system determines that an accumulation event occurs if the sporting event participant holding the football interacts with and/or makes a play in the area of the displayed game field associated with a plurality of the placed symbols on the virtual game field. Conversely, in this example, the system determines an accumulation event did not occur if the sporting event participant holding the football does not interact with and/or make a play in the area of the displayed game field associated with a plurality of the placed symbols on the virtual game field.

In another embodiment, the system of the present disclosure utilizes the virtual game field to modify one or more attributes of one or more areas of the sporting event game field. For example, during display of a horse racing event, the system overlays a virtual game field onto a displayed horse track (i.e., the sporting event game field) such that the system modifies the displayed horse racing event to virtually show each participating horse of the horse racing event pulling a cart. In this example, each horse is a real horse participating in the horse racing event and the system generates and displays a virtual cart connected to each horse by a virtual rope onto the virtual game field.

In certain embodiments employing this modified horse race, the system enables the placement of a plurality of symbols onto the virtual game field associated with an area of the displayed horse track (i.e., sporting event game field). That is, the system enables placement of the symbols on the virtual game field such that each horse of the horse racing event is associated with a symbol placed on the virtual game field and each virtually displayed cart is associated with a symbol placed on the virtual game field. In certain embodiments the system randomly positions or assigns different symbols to each horse and each virtually displayed cart. In certain other embodiments, the system enables the player to utilize skill or knowledge of horse racing to select the placement of different symbols for each horse and each virtually displayed cart.

In certain embodiments employing this modified horse race, the position of the symbols placed on the virtual game field change over time (e.g., during the horse race). For example, a symbol associated with a horse could randomly change to a different symbol (e.g., from a cherry symbol to a banana symbol) if that horse's position changes during the race (e.g., horse goes from $4^{th}$ place to $5^{th}$ place during the race).

In certain embodiments employing this modified horse race, the system accumulates or collects each symbol of the plurality of symbols associated with each horse and each virtually displayed cart into a collection of symbols. For example, the system accumulates a symbol associated with a horse when that horse crosses the finish line or other such point during the horse race. Similarly, the system accumulates a symbol associated with a virtual cart being pulled by a horse when that virtual cart crosses the finish line or other such point during the horse race. In this example, once all of the horses and virtual carts cross the finish line or other such point of the horse race, the system evaluates the collection of symbols. In certain embodiments, the system accumulates a symbol associated with a horse and a symbol associated with a virtual cart being pulled by that horse when the horse crosses the finish line or other such point during the horse race.

In certain embodiments employing this modified horse race, the system randomly varies (e.g., increase or decrease) the length of the virtual rope that attaches each virtually displayed cart to a horse during the horse race. For example, the system randomly increases the length of the virtual rope attached to a first cart and randomly decreases the length of the virtual rope attached to a second cart during the horse race. As such, the random increase and decrease of the virtual rope length can change the position of the first cart and the second cart during the horse race. For example, utilizing historical horse racing, the system assigns, such as randomly, playing cards to each of the horses and each of the carts with varying distances between each horse and a respective cart, wherein playing cards associated with the first five horses form the deal cards and the playing cards associated with the first five carts (which may not correspond to the first five horses due to the varying distances between horses and carts) form the optional draw cards. In operation of this example, the system deals the five playing cards from the first five horses (which could be from one or more historical races). If the player chooses to hold/discard, the system utilizes replacement cards from the carts (either in the order in which the carts crossed the finish line or randomly).

In certain embodiments, the plurality of symbols include shapes and/or colors. In these embodiments, the system utilizes a paytable to award certain patterns formed by the collection of symbols accumulated during the sporting event. For example, the system provides an award for a collection of symbols forming a designated symbol pattern, including but not limited to, a symbol pattern of three squares in a row, or a symbol pattern of four purple symbols in a row, or other suitable designated symbol pattern.

In one embodiment, the system provides a group aspect to the placement of a plurality of symbols. In one such embodiment, the system enables a plurality of players to cooperate or otherwise play together in the placement and accumulation of a plurality of symbols in association with a sporting event. In another such embodiment, the system enables a plurality of players compete or play against each other to win zero, one or more awards in association with the placement and accumulation of the plurality of symbols in association with a sporting event.

Alternative Embodiments

It should be appreciated that in different embodiments, one or more of:

i. whether to display a game field of a sporting event;
ii. how to map a virtual game field to a game field of a sporting event;
iii. when to place a plurality of symbols on a virtual game field overlaid to a game field of a sporting event;
iv. where to place a plurality of symbols on a virtual game field overlaid on a sporting event game field;
v. a quantity of symbols to place on a virtual game field overlaid on a game field of a sporting event;
vi. a wager amount to place on a plurality of symbols placed on a virtual game field overlaid on a game field of a sporting event;
vii. whether an accumulation event occurs in association with a plurality of symbols placed on a virtual game field overlaid on a game field of a sporting event;
viii. when to remove a plurality of symbols placed on a virtual game field overlaid on a game field of a sporting event; and/or
ix. any determination of the present disclosure;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

Gaming Systems

The above-described embodiments of the sports betting system using a plurality of placed symbols configuration may be implemented in accordance with or in conjunction with one or more of a variety of different types of systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
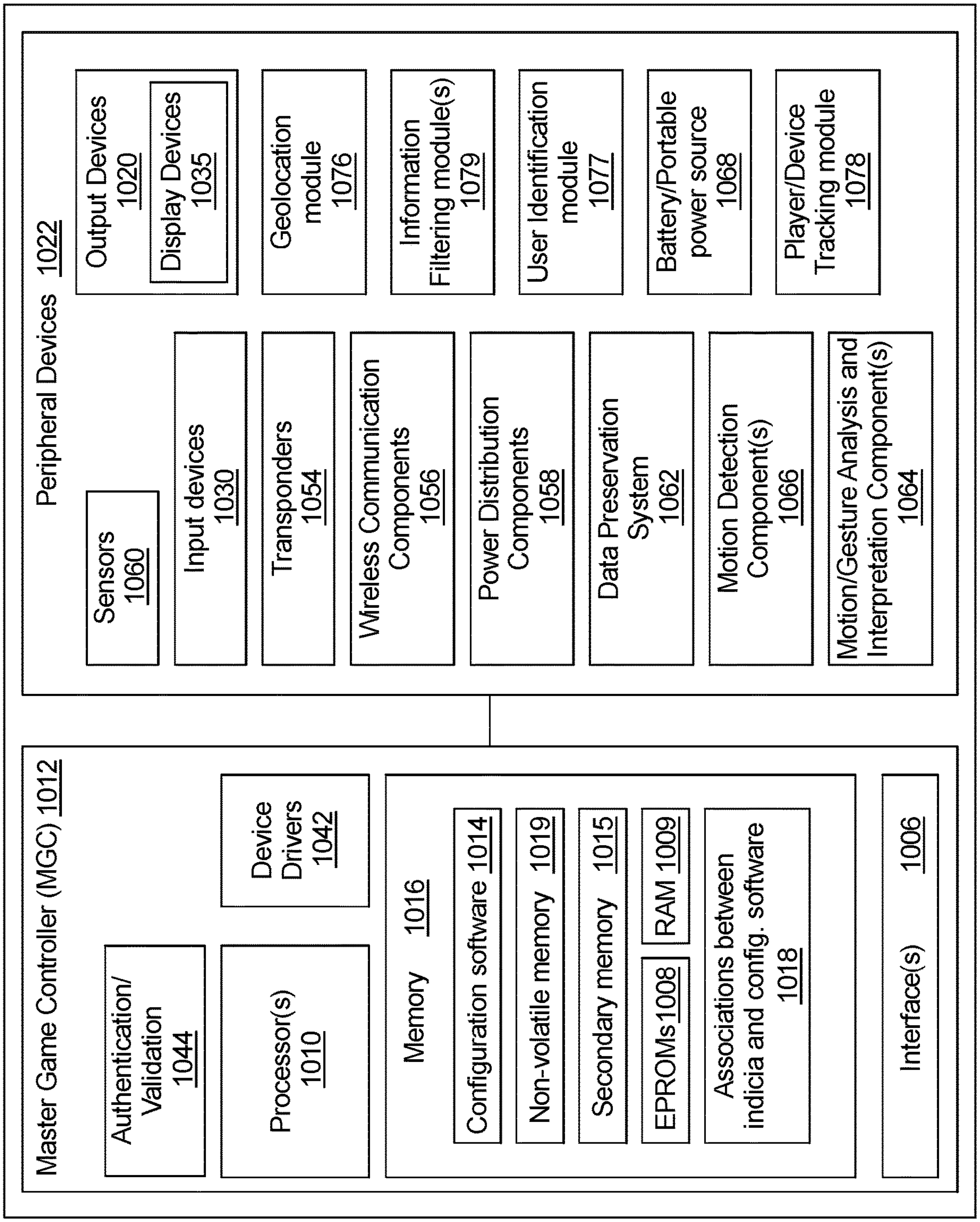
FIG. 3 is a schematic block diagram of one embodiment of an electronic configuration of an example gaming system of the present disclosure.
Figure 4A:
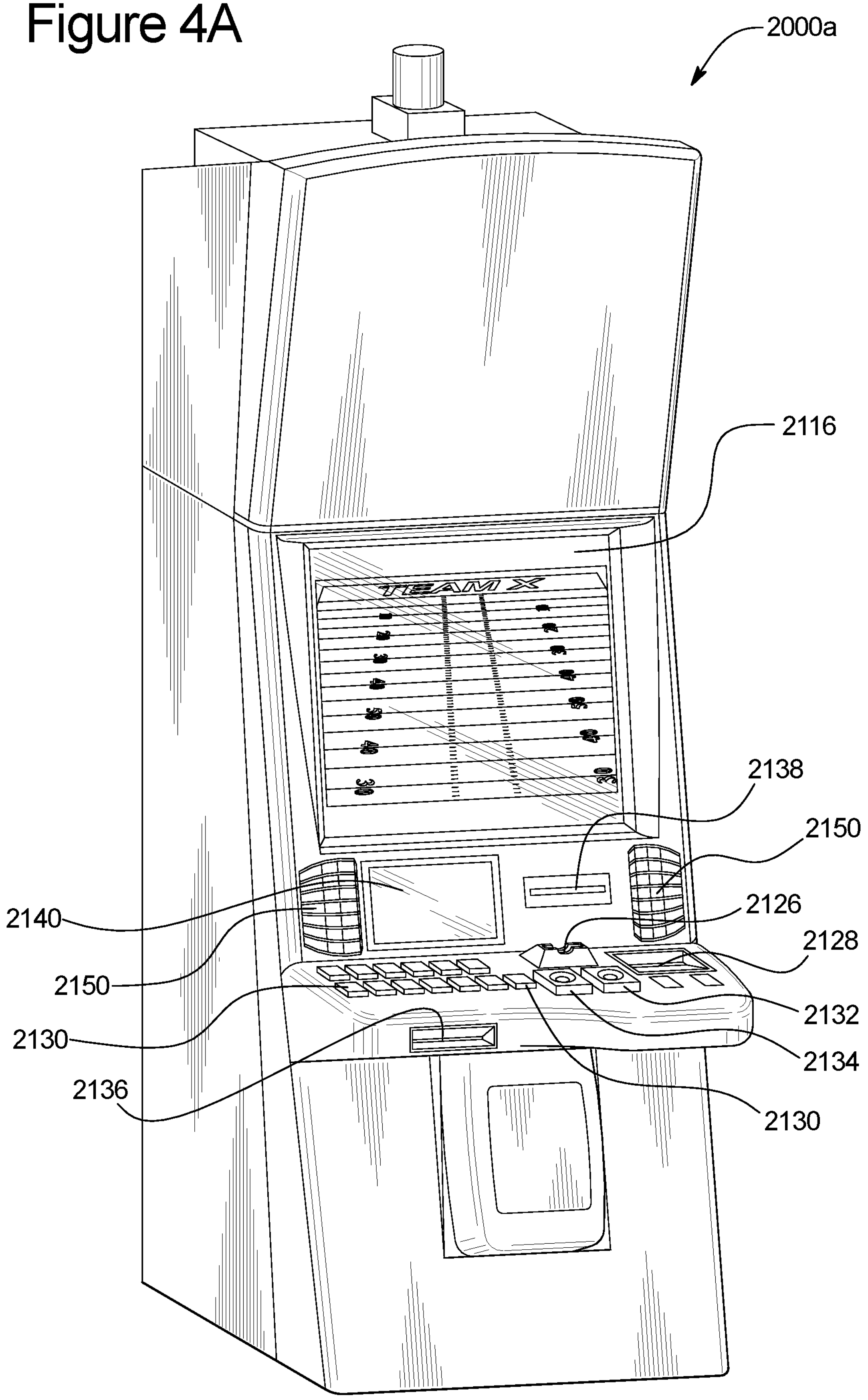
FIGS. 4A and 4B are perspective views of example alternative embodiments of the gaming system of the present disclosure.
Figure 4B:
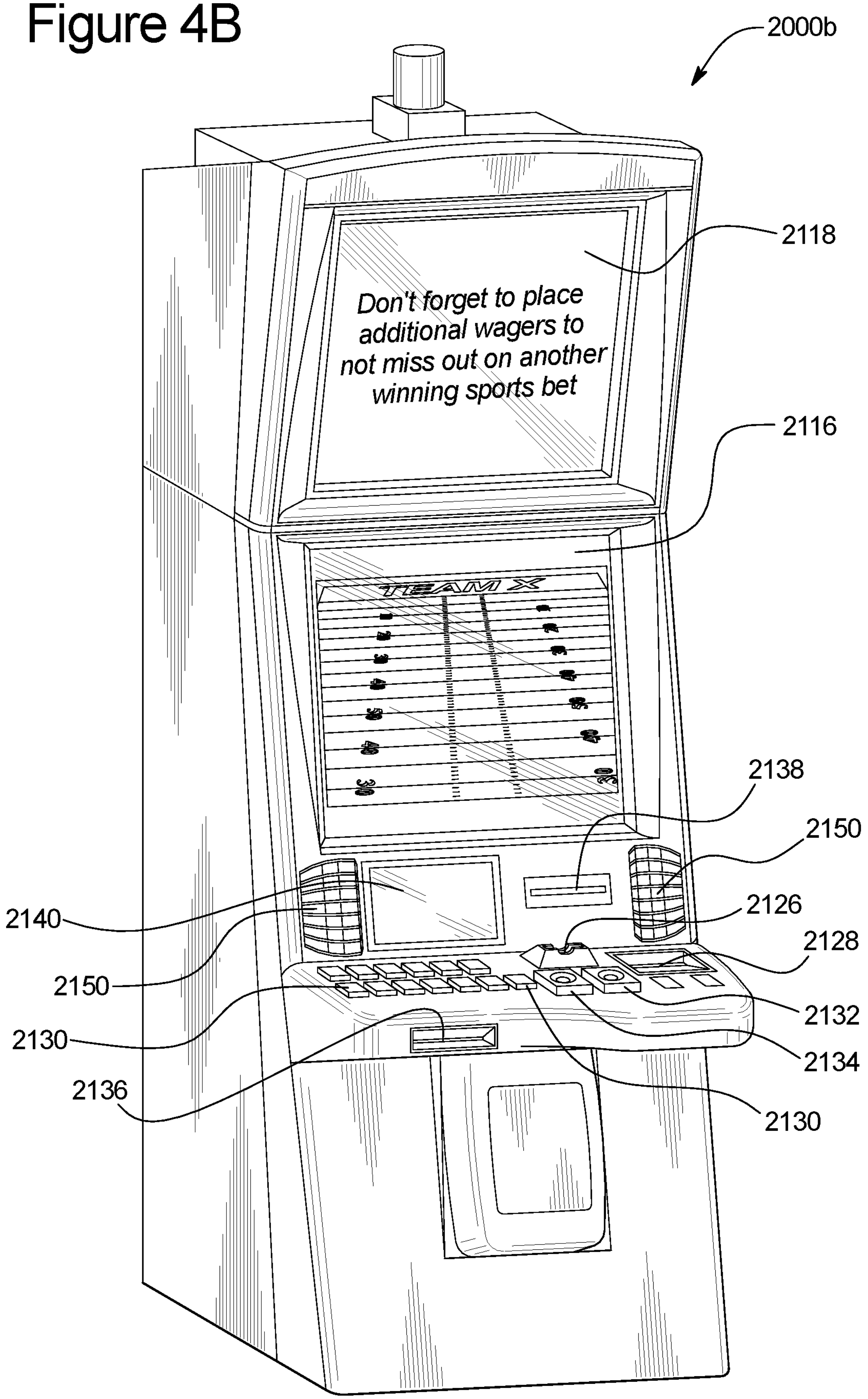
Figure 4C:
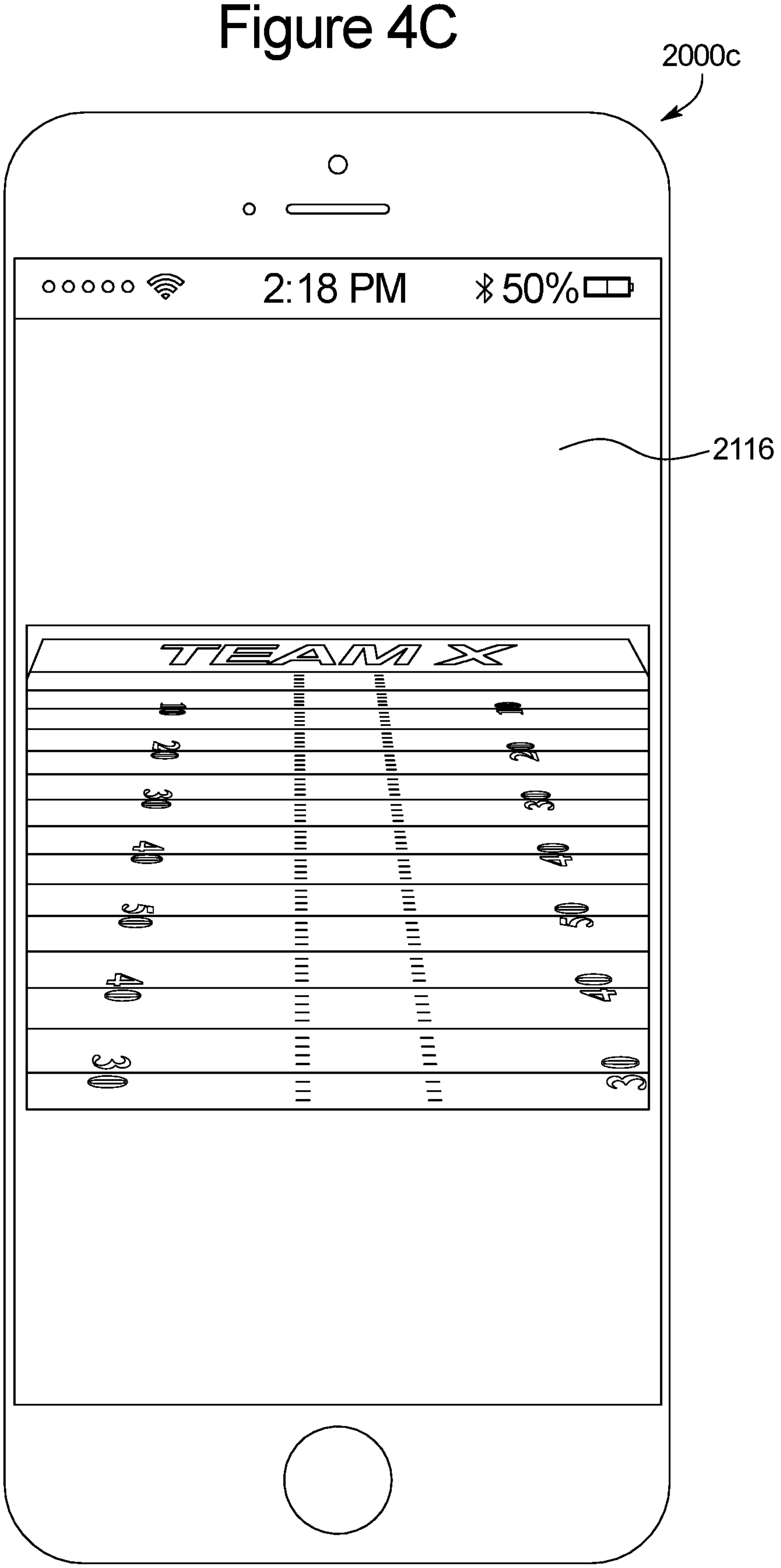
FIG. 4C is a front view of an example personal gaming device of the gaming system of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In certain embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs **2000*a* and 2000*b* illustrated in FIGS. 4A and 4B each include a ticket printer and dispenser 2136**. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs **2000*a* and 2000*b* illustrated in FIGS. 4A and 4B each include a plurality of speakers 2150**. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 4B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in certain embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A system comprising:

a processor; and a memory device that stores a plurality of instructions that, when executed by the processor, cause the processor to:

cause a display device to display a game field associated with a sporting event, cause the display device to display a placement of a quantity of symbols on a virtual game field overlaid on the displayed game field associated with the sporting event, and for each of a plurality of symbol display positions, responsive to an event occurring during the sporting event in an area of the displayed game field corresponding to an area of the virtual game field associated with one of the plurality of placed symbols, cause the display device to display that placed symbol at that symbol display position.

2. The system of claim 1, wherein the plurality of symbol display positions are associated with a plurality of reels.

3. The system of claim 1, wherein the memory device stores a plurality of further instructions that, when executed by the processor, cause the processor to cause the display device to display a placement of a first quantity of symbols on the virtual game field responsive to a first input being received, and a placement of a second different quantity of symbols on the virtual game field responsive to a second, different input being received.

4. The system of claim 1, wherein the memory device stores a plurality of further instructions that, when executed by the processor, cause the processor to randomly cause the display device to display a placement of a symbol of the quantity of symbols on the virtual game field.

5. The system of claim 1, wherein the memory device stores a plurality of further instructions that, when executed by the processor responsive to an input received by an input device, cause the processor to cause the display device to display a placement of a symbol of the quantity of symbols on the virtual game field.

6. The system of claim 1, wherein the plurality of symbols are associated with a plurality of playing cards.

7. The system of claim 1, wherein the memory device stores a plurality of further instructions that, when executed by the processor responsive to a designated symbol being displayed at a designated symbol display position, cause the processor to modify that symbol.

8. The system of claim 1, wherein for each placed symbol, the event occurring during the sporting event comprises a plurality of events occurring at different times during the sporting event which each occur in the area of the displayed game field corresponding to the area of the virtual game field associated with that placed symbol.

9. The system of claim 1, wherein for each placed symbol, the event occurring during the sporting event comprises an event independent of any participant in the sporting event.

10. A system comprising:

a processor; and a memory device that stores a plurality of instructions that, when executed by the processor, cause the processor to:

cause a display device to display a game field associated with a sporting event, responsive to a first condition being satisfied and a first input received by an input device, cause the display device to display a placement of a first plurality of symbols on a virtual game field overlaid on the displayed game field associated with the sporting event, responsive to a second, different condition being satisfied and a second, different input received by the input device, cause the display device to display a placement of a second, different plurality of symbols on the virtual game field overlaid on the displayed game field associated with the sporting event, and for each of a plurality of symbol display positions associated with a plurality of reels, responsive to an event occurring during the sporting event in an area of the displayed game field corresponding to an area of the virtual game field associated with one of the plurality of placed symbols, cause the display device to display that placed symbol at that symbol display position.

11. A method of operating a system, the method comprising:

displaying, by a display device, a game field associated with a sporting event, displaying, by the display device, a placement of a quantity of symbols on a virtual game field overlaid on the displayed game field associated with the sporting event, and for each of a plurality of symbol display positions, responsive to an event occurring during the sporting event in an area of the displayed game field corresponding to an area of the virtual game field associated with one of the plurality of placed symbols, displaying, by the display device, that placed symbol at that symbol display position.

12. The method of claim 11, wherein the plurality of symbol display positions are associated with a plurality of reels.

13. The method of claim 11, further comprising displaying, by the display device, a placement of a first quantity of symbols on the virtual game field responsive to a first input being received, and displaying, by the display device, a placement of a second different quantity of symbols on the virtual game field responsive to a second, different input being received.

14. The method of claim 11, further comprising displaying, by the display device, a random placement of a symbol of the quantity of symbols on the virtual game field.

15. The method of claim 11, further comprising, responsive to an input received by an input device, displaying, by the display device, a placement of a symbol of the quantity of symbols on the virtual game field.

16. The method of claim 11, wherein the plurality of symbols are associated with a plurality of playing cards.

17. The method of claim 11, wherein for each placed symbol, the event occurring during the sporting event comprises a plurality of events occurring at different times during the sporting event which each occur in the area of the displayed game field corresponding to the area of the virtual game field associated with that placed symbol.

18. The method of claim 11, wherein for each placed symbol, the event occurring during the sporting event comprises an event independent of any participant in the sporting event.

* * * * *